United States Patent [19]
Deidewig et al.

[11] Patent Number: 5,778,728
[45] Date of Patent: Jul. 14, 1998

[54] GEAR SHIFTING DEVICE FOR A CHANGE-SPEED GEARBOX, PARTICULARLY FOR MOTOR VEHICLES

[75] Inventors: Hartmut Deidewig, Roesrath; Jean-Pierre Chazotte; Gustav Sabel, both of Cologne; Mathias Doelling, Gladbach, all of Germany

[73] Assignee: Ford Global Technologies, Inc., Dearborn, Mich.

[21] Appl. No.: 797,258

[22] Filed: Feb. 7, 1997

[30] Foreign Application Priority Data

Feb. 17, 1996 [DE] Germany .................. 196 05 980.1

[51] Int. Cl.$^6$ ................. F16H 5/04; F16H 61/26
[52] U.S. Cl. .................. 74/473.25; 74/473.22; 74/473.23
[58] Field of Search ............ 74/473.25, 473.21, 74/473.22, 473.23, 473.24

[56] References Cited

U.S. PATENT DOCUMENTS

| | | | |
|---|---|---|---|
| 2,498,889 | 2/1950 | Iavelli | 74/473.25 |
| 4,497,216 | 2/1985 | Kawamoto | 74/473.25 |
| 4,892,001 | 1/1990 | Meyers et al. | 74/473.25 |
| 5,492,209 | 2/1996 | Certeza | 74/473.25 |

FOREIGN PATENT DOCUMENTS

| | | |
|---|---|---|
| 2 318 451 | 10/1974 | Germany . |
| 2603339 C3 | 5/1986 | Germany . |

*Primary Examiner*—Charles A. Marmor
*Assistant Examiner*—David M. Fenstermacher
*Attorney, Agent, or Firm*—James J. Dottavio

[57] ABSTRACT

A gear shifting device for change-speed gearboxes having a forward gear and a reverse gear in a common shift plane, including a housing, a shifter rod slidably supported within the housing, a shifter fork having a bridge axially slidable on the shifter rod, and a shifter arm having a selector finger selectively engageable with the shifter fork. The shifter arm moves in a first direction from a neutral position to select the forward gear and in a substantially opposite second direction from the neutral position to select the reverse gear. A first pin and cam connection is provided between the shifter arm and reverse gear so that movement of the selector finger in the first direction of the shift plane from the neutral position engages forward gear while reverse gear is not affected by movement in the first direction. A second pin and cam connection is provided between the shifter arm and forward gear so that movement of the selector finger in the second direction of the shift plane from the neutral position engages reverse gear and the forward gear is not affected by movement in the second direction.

11 Claims, 5 Drawing Sheets

GEAR SHIFTING DEVICE FOR A CHANGE-SPEED GEARBOX, PARTICULARLY FOR MOTOR VEHICLES

BACKGROUND OF THE INVENTION

1. Field of the Invention

The invention relates to a gear shifting device for a change-speed gearbox, particularly for motor vehicles.

2. Discussion of Related Art

German Offenlegungsschrift 23 18 451 discloses a gear shifting device for change-speed gearboxes in which shifter fork bridges are slidably mounted on a shifter rod, which is itself axially slidable in the gearbox housing. The sliding movement of the fork bridges is caused by a selector finger of a shifter shaft which engages in corresponding selector gates in shifter arms in order to engage the various gears.

German patent 26 03 339 (German '339) discloses a gear shifting device for change-speed gearboxes, in which an axially slidable shifter rod for shifting a forward gear also serves to shift a reverse gear, the reverse gear being engaged by means of a shifter rocker which is actuated through a pin/angled slot connection. The gear shift device design of the German '339 patent suffers from the disadvantage that the axially slidable shifter rod performs movements in both directions of engagement. Thus, with the sliding sleeve which is actuated by the shifter fork for the forward gear, a corresponding empty run must be provided in the reverse gear engagement direction.

It would therefore be desirable to provide a gear shifting device for a change-speed gearbox in which the axially slidable shifter rod does not need to perform an empty run during the reverse gear engagement movement.

SUMMARY OF THE INVENTION

According to the present invention, a gear shifting device for a change-speed gearbox is provided in which the axially slidable shifter rod does not need to perform an empty run during the reverse gear engagement movement. A gear shifting device for a change-speed gearbox is provided having a forward gear and a reverse gear in a common shift plane, including a housing, a shifter rod slidably supported within said housing, a shifter fork having a bridge axially slidable on said shifter rod, and a shifter arm having a selector finger selectively engageable with said shifter fork. The shifter arm moves in a first direction from a neutral position to select the forward gear, and in a substantially opposite second direction from the neutral position to select the reverse gear. A first pin and cam connection is provided between the shifter arm and reverse gear so that movement of the selector finger in the first direction of the shift plane from the neutral position engages forward gear while reverse gear is not affected by movement in the first direction. A second pin and cam connection is provided between the shifter arm and forward gear so that movement of the selector finger in the second direction of the shift plane from the neutral position engages reverse gear and the forward gear is not affected by movement in the second direction. Thus, no empty run is needed inside the gearbox housing for the sliding of the shifter rod.

BRIEF DESCRIPTION OF THE DRAWINGS

The invention will now be described in more detail, by way of example, with reference to embodiments shown in the accompanying drawings, in which.

DETAILED DESCRIPTION OF PREFERRED EMBODIMENTS

Figure 1:
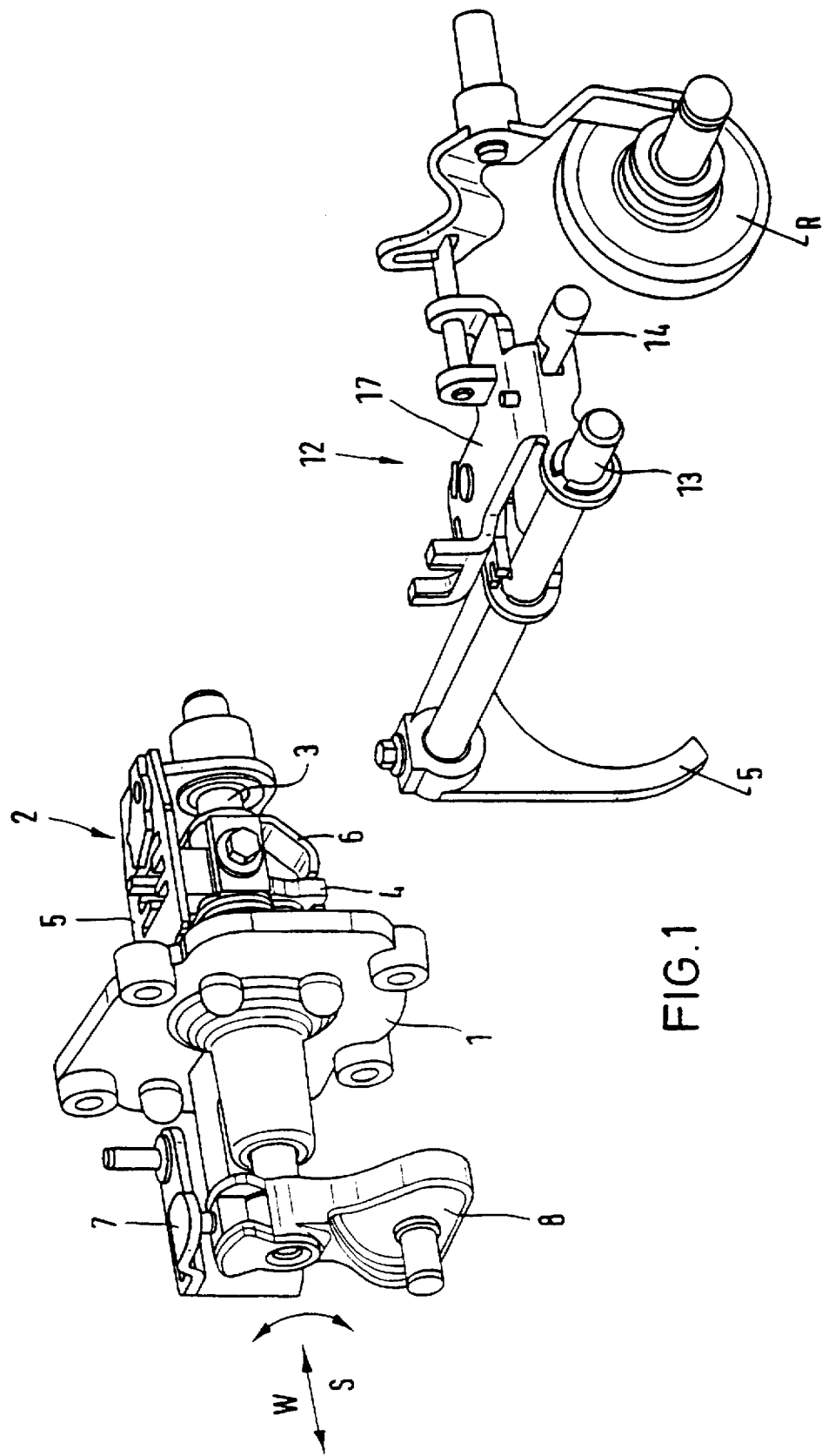
FIG. 1 is an exploded view showing a gear shifting device according to the present invention.

FIG. 1 shows a gear shifting device cover 1, on which the whole outer gear shifting device 2, consisting essentially of a shifter shaft 3 with a selector finger 4, and a gate guide 5, and an interlock device 6, is mounted. The shifter shaft 3 is mounted in the gear shifting device cover 1 to be axially slidable for selection (W) and rotatable for shifting (S), through external lever arrangements 7 and 8, which are actuated in a preferred embodiment using Bowden cables attached thereto. The construction of the outer gear shifting device 2 is similar to a component known in the prior art and presently used in some of the applicant's vehicles, and is therefore not described herein in detail.

The present invention is included in the inner gear shifting device 12, shown in the lower part of FIG. 1, with only the gear shifting device for the fifth gear and the reverse gear shown. The inner gear shifting device 12 consists essentially of an axially slidable shifter rod 13 which is guided in the gearbox housing. Parallel to the axially slidable shifter rod 13, an axially fixed shifter rod 14 is fitted in the gearbox housing.

Figure 2:
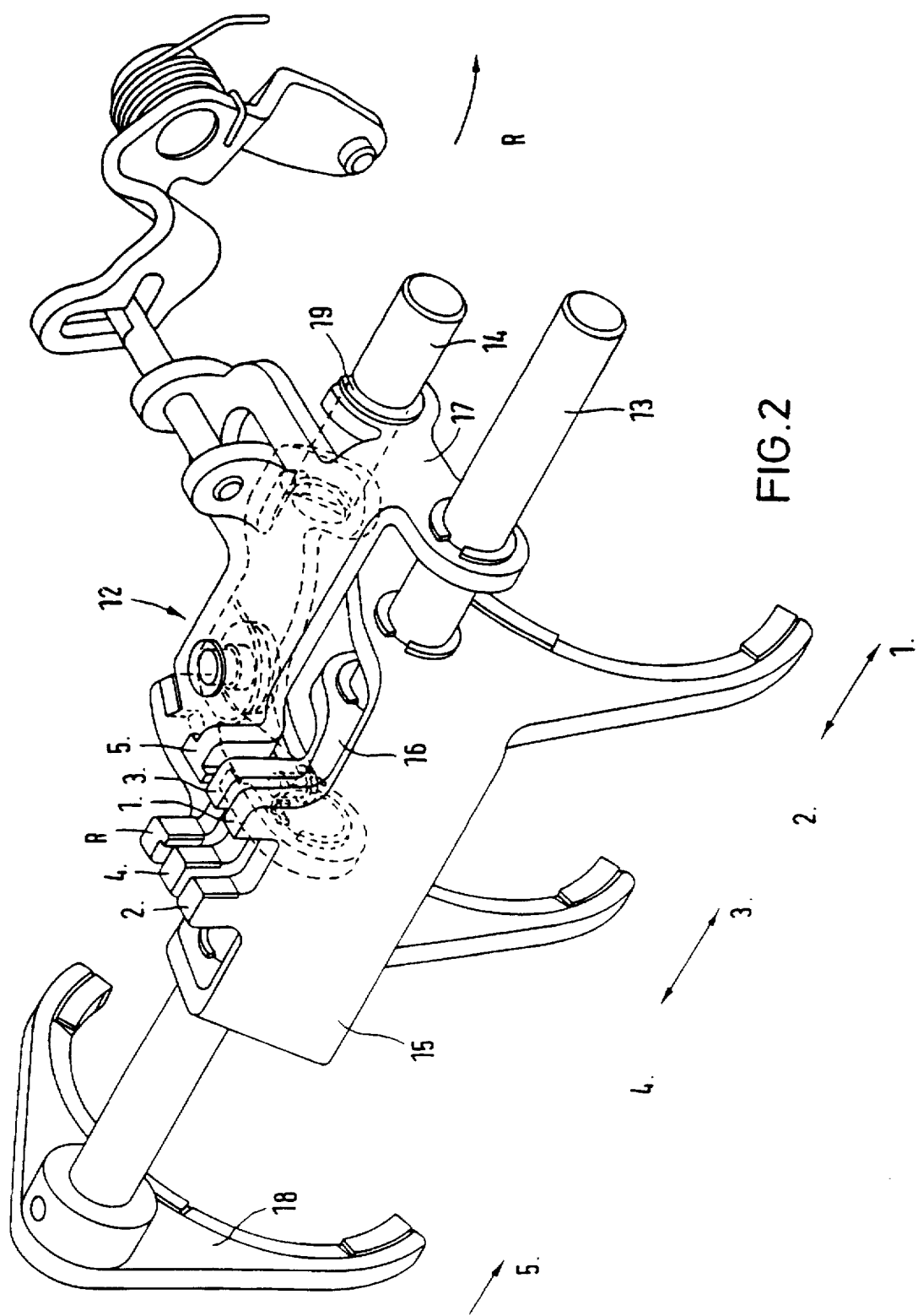
FIG. 2 is an enlarged view of the inner gear shifting device shown in FIG. 1.
Figure 3:
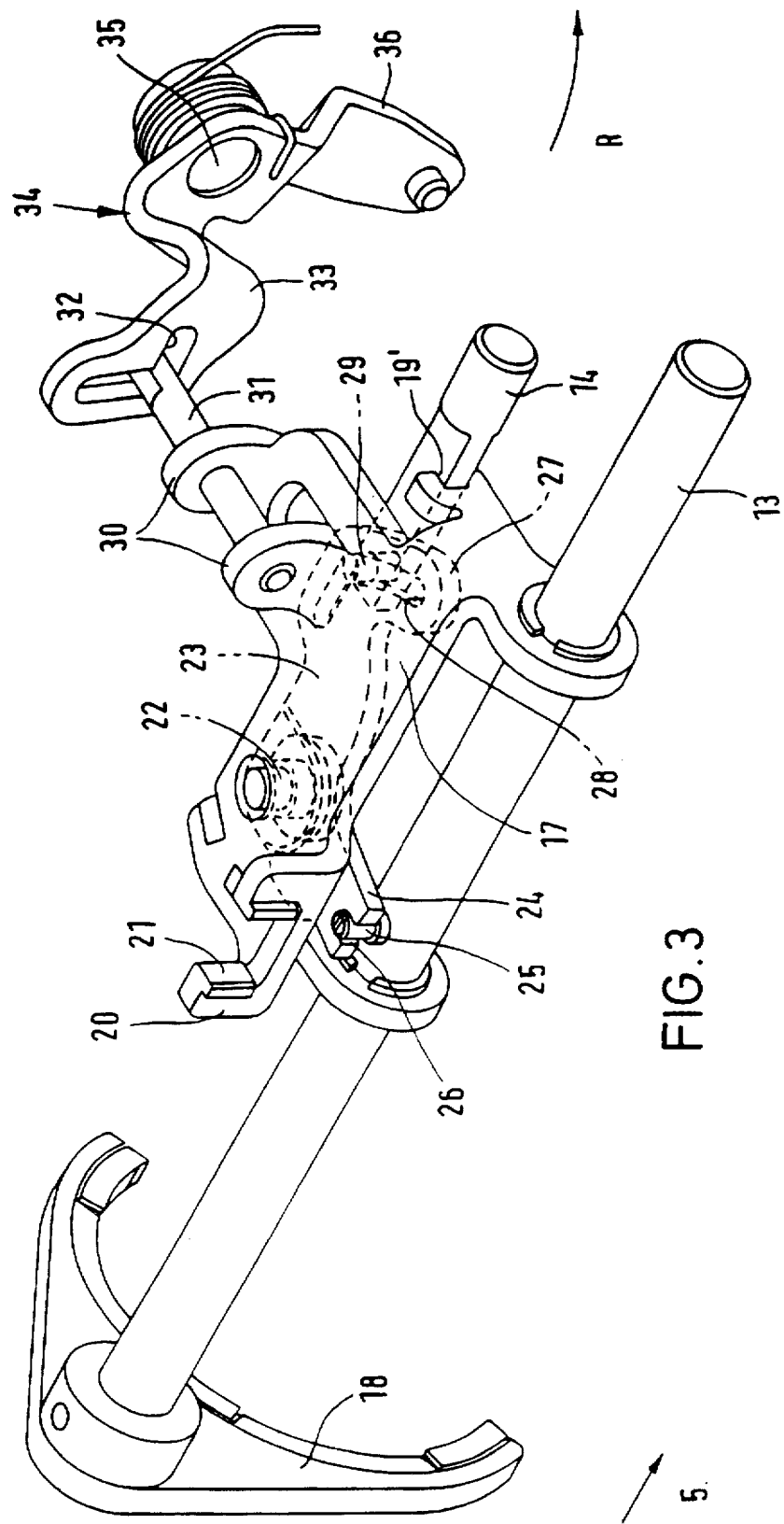
FIG. 3 is a view of the inner gear shifting device shown in FIG. 1 with the shifter fork bridge shown in its neutral position with an indication of the engagement movements.
Figure 4:
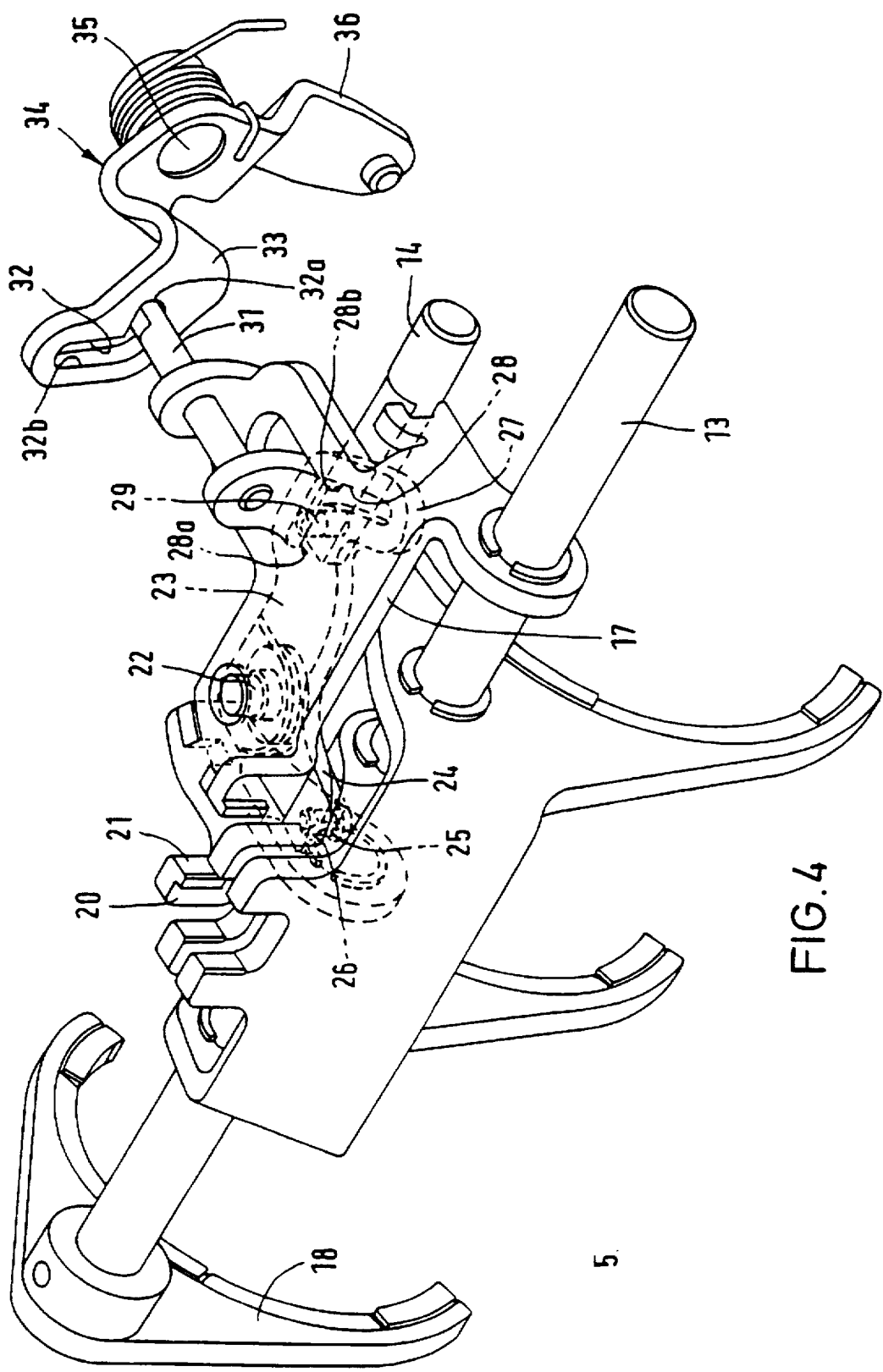
FIG. 4 is a view of the inner gear shifting device of FIG. 1 in the fifth gear shifting position.
Figure 5:
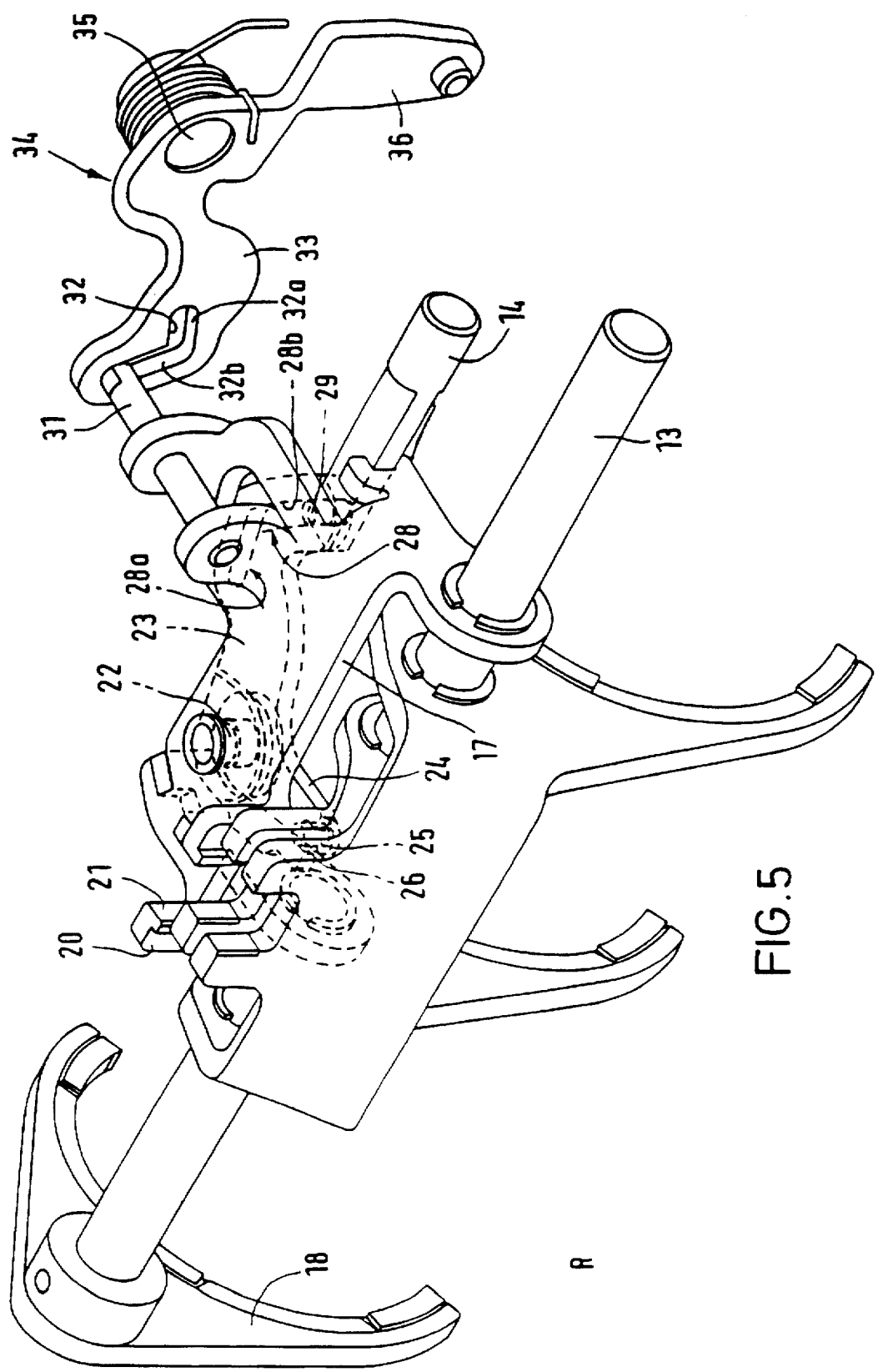
FIG. 5 is a view of the inner gear shifting device of FIG. 1 in the reverse gear shifting position.

FIG. 2 shows all three shifter fork bridges required for gears steps 1 to 5 and reverse, and the rest of the inner gear shifting device 12. FIGS. 2 and 3 include a numerical designation indicating the direction of movement to obtain a desired gear, provided numerically by gear 1, 2, 3, 4, 5 and R, respectively. FIGS. 4 and 5 include a numerical designation 5 and R, respectively, to indicate the present gear state. Returning now to FIG. 2, on the axially slidable shifter rod 13, and slidable relative to it, several shifter fork bridges are fitted, namely, a shifter fork bridge 15 for shifting first and second gears, a shifter fork bridge 16 for shifting third and fourth gears, and a shifter fork bridge 17 for shifting fifth and reverse gears. A shifter fork 18 for shifting the fifth gear is fixed on the axially slidable shifter rod 13. The shifter fork bridge 17 for the fifth gear and the reverse gear is supported on the fixed shifter rod 14 by half-round guides 19 to prevent bridge 17 from twisting about the axis of the shifter rod 13. As is well known in the art, the forward gears are preferably engaged through synchronizers actuated by the forward shift forks. Reverse gear is actuated by the reverse shift fork moving a reverse gear into engagement, as is well known in the art.

FIG. 3 illustrates only those parts of the gear shifting device required for the shifting of the fifth and reverse gears, shown in a neutral position. The shifter fork bridge 17 for fifth gear and reverse gear is mounted on the axially slidable shifter rod 13 and the fixed-position member 14, which is preferably embodied as a fixed shifter rod 14, arranged parallel to shifter rod 13 so that the fork bridge 17 is prevented from rotating about the axis of the slidable shifter rod 13, with the means of preventing twisting preferably being a flat guide 19'.

The shifter fork bridge 17 has a shifter arm 20 with a selector gate 21. By engaging the selector finger 4 into the selector gate 21, the shifter fork bridge 17 is actuated to slide along the slidable shifter rod 13. The shifter fork bridge 17 also carries a pin 22 on which an angled lever 23 is pivotally mounted. The angled lever 23 has an arm 24 with which it is in operating engagement, through a pin-and-notch connection 25, 26, with the axially slidable shifter rod 13. The angled lever 23 has a further arm 27 with an arcuate slot 28 forming a cam surface. A pin 29 is carried on a fixed point in the housing, the pin 29 engaged in the slot 28. In a preferred embodiment, the pin 19 is carried by the fixed shifter rod 14. Since the pin 29 is fixed on fixed shifter rod 14, the motion of the shifter fork bridge 17 causes the arcuate slot 28 to move relative to the pin 29.

Brackets 30 are formed on the shifter fork bridge 17. The brackets 30 are provided to carry a shifter pin 31, which engages an angled slot 32 forming a second cam surface in one arm 33 of a shifter rocker 34. The rocker 34 is rotatably mounted on a pivot pin 35. An arm 36 of the rocker 34 serves to actuate the reverse gear.

FIG. 4 shows the shifter fork bridge 17 moved in the fifth gear engagement direction from the neutral position shown in FIG. 3. Because the angled lever 23 connected to the shifter fork bridge 17 is in the section 28a of its arcuate slot 28, which extends parallel to the shifter rod 13, the angled lever 23 does not swing out. Rather, through the pin-and-notch connection 25/26, the shifter fork bridge 17 engages the shifter rod 13 and causes the shifter rod 14 to follow the axial motion of the shifter fork bridge 17 and engages the fifth gear by means of the shifter fork 18.

During this movement of the bridge 17 in this first (fifth gear) direction, the shifter pin 31 moves with the bridge 17 in the section 32a of the angled slot in the arm 33 of the shifter rocker 34 for the reverse gear and does not cause any rotation of this shifter rocker 34 nor movement of reverse gear, and therefore reverse gear is not affected by movement in the first direction.

FIG. 5 shows the shifter fork bridge 17 moved in a second, or reverse gear engagement, direction. During this movement, the pin 29 fixed in the housing runs along a section 28b of the arcuate slot 28 of special geometrical shape, which leads to a swinging-out movement of the angled lever 23, which holds the shifter rod 13 stationary through the pin-and-notch connection 25/26, even as the shifter fork bridge 17 moves relatives to the shifter rod 13.

Since the shifter pin 31 fixed to the shifter fork bridge 17 is now moving in the other section 32b of the angled slot 32 on the shifter rocker 34 for the reverse gear, swinging of this shifter rocker 34 engages the reverse gear by means of its arm 36 and the forward gear is not affected by movement in the second direction.

It is pointed out that the manner of guidance of the shifter fork bridges on the axially slidable shifter rod and the form of the various pin-and-slot connections is only indicated by way of example, and obviously various constructional variants are possible to provide a cam between the selector finger 4 and each of the reverse gear and a forward gear actuated in the same shift plane. Thus, any such interconnection providing for movement in the shift plane in a first direction engages the proper gear while no movement of the engagement mechanism for the other gear in that plane occurs.

While the above detailed descriptions describe preferred embodiments of the present invention, numerous modifications are envisioned which may be made without departing from the true spirit and scope of the present invention.

We claim:
1. A gear shifting device for change-speed gearboxes having a forward gear and a reverse gear, comprising:
  a housing;
  a shifter rod slidably supported within said housing carrying a shifter fork to engage the forward gear;
  a shifter fork bridge axially slidable relative to said shifter rod;
  a shifter arm having a selector finger selectively engageable with said shifter fork bridge, said shifter arm moving in a first direction from a neutral position to select the forward gear and in a substantially opposite second direction from the neutral position to select the reverse gear;
  a first pin and cam connection between the shifter arm and the reverse gear so that movement of the selector finger in the first direction from the neutral position engages the forward gear while the reverse gear is not affected by movement in the first direction; and
  a second pin and cam connection between the shifter arm and the forward gear so that movement of the selector finger in the second direction from the neutral position engages the reverse gear and the shifter fork is not affected by movement in the second direction.

2. A gear shifting device for change-speed gearboxes according to claim 1, wherein the first pin and cam connection comprises:
  a lever pivotally supported by said housing, said lever having a first end with a slot having a cam profile provided therein and a second end operatively connected to the reverse gear to cause engagement and disengagement thereof;
  a pin supported by said shifter fork bridge, said pin having a first end engaged with said slot to cause rotation of said lever when said shifter rod is moved in said first direction to engage said reverse gear.

3. A gear shifting device for change-speed gearboxes according to claim 1, wherein the second pin and cam connection comprises:
  a first lever pivotally supported by said shifter fork bridge, said first lever having a first end with a slot having a cam profile provided therein and a second end operatively connected to the shift fork to cause engagement and disengagement of the forward gear; and
  a pin supported by said housing, said pin having a first end engaged with said slot to cause rotation of said lever when said shifter rod is moved in said second direction to engage said forward gear.

4. A gear shifting device for change-speed gearboxes according to claim 3, wherein the first pin and cam connection comprises:
  a second lever pivotally supported by said housing, said second lever having a first end with a slot having a cam profile provided therein and a second end operatively connected to the reverse gear to cause engagement and disengagement thereof; and
  a second pin supported by said shifter fork bridge, said second pin having a first end engaged with said slot to cause rotation of said lever when said shifter rod is moved in said first direction to engage said reverse gear.

5. A gear shifting device for change-speed gearboxes according to claim 4, wherein said first and second cams comprise first and second arcuate slots formed in said levers, respectively.

6. A gear shifting device for change-speed gearboxes according to claim 5, further comprising an axially fixed shifter rod supported by said housing, said axially fixed shifter rod slidably engaged by said shifter fork bridge to prevent rotation of said shifter fork bridge.

7. A gear shifting device for change-speed gearboxes according to claim 6, further comprising:

a third pin radially projecting from said shifter rod; and said first lever having a second end with a slot provided therein engaged by said third pin for engagement of said forward gear.

8. A gear shifting device for change-speed gearboxes having a forward gear and a reverse gear in a common shift plane, comprising:

a housing;

a shifter rod slidably supported within said housing carrying a shifter fork;

a shifter fork bridge axially slidably supported by said shifter rod;

a shifter arm having a selector finger selectively engageable with said shifter fork bridge, said shifter arm moving in said common plane in a first direction from a neutral position to select the forward gear and in a substantially opposite second direction from the neutral position to select the reverse gear;

a first lever pivotally supported by said housing, said first lever having a first end with a first slot having a first cam profile provided therein and a second end operatively connected to the reverse gear to cause engagement and disengagement thereof;

a first pin supported by said shifter fork bridge, said first pin having a first end engaged with said first slot to cause rotation of said first lever when said shifter arm is moved in said first direction to engage said reverse gear and to not cause rotation of said first lever when said shifter arm is moved in said second direction;

a second lever pivotally supported by said shifter fork bridge, said second lever having a first end with a second slot having a second cam profile provided therein and a second end operatively connected to the forward gear to cause engagement and disengagement thereof; and a second pin supported by said housing, said second pin having a first end engaged with said second slot to cause rotation of said second lever when said shifter arm is moved in said second direction to engage said forward gear and not to cause rotation of said second lever when said shifter arm is moved in said first direction.

9. A gear shifting device for change-speed gearboxes according to claim 8, wherein said first and second cams comprise first and second arcuate slots formed in said levers, respectively.

10. A gear shifting device for change-speed gearboxes according to claim 9, further comprising an axially fixed shifter rod supported by said housing, said axially fixed shifter rod slidably engaged by said shifter fork bridge to prevent rotation of said shifter fork bridge.

11. A gear shifting device for change-speed gearboxes according to claim 10, further comprising:

a third pin radially projecting from said shifter rod; and said first lever having a second end with a slot provided therein engaged by said third pin for engagement of said forward gear.

* * * * *